US008560857B2

(12) United States Patent  
Munetoh et al.

(10) Patent No.: US 8,560,857 B2
(45) Date of Patent: *Oct. 15, 2013

(54) INFORMATION PROCESSING APPARATUS, A SERVER APPARATUS, A METHOD OF AN INFORMATION PROCESSING APPARATUS, A METHOD OF A SERVER APPARATUS, AND AN APPARATUS EXECUTABLE PROGRAM

(75) Inventors: Seiji Munetoh, Kawasaki (JP); Hiroshi Maruyama, Tokyo-to (JP); Frank Seliger, Altdorf (DE); Nataraj Nagaratnam, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/432,715

(22) Filed: Mar. 28, 2012

(65) Prior Publication Data

US 2012/0185694 A1 Jul. 19, 2012

Related U.S. Application Data

(63) Continuation of application No. 11/001,817, filed on Dec. 2, 2004, now Pat. No. 8,171,295.

(30) Foreign Application Priority Data

Dec. 2, 2003 (JP) ................................. 2003-403371

(51) Int. Cl.
*H04L 29/06* (2006.01)
(52) U.S. Cl.
USPC .......................................... 713/176; 713/167
(58) Field of Classification Search
None
See application file for complete search history.

(56) References Cited

U.S. PATENT DOCUMENTS

| 6,144,959 | A  | 11/2000 | Anderson et al. |
| 6,985,953 | B1 | 1/2006  | Sandhu et al. |
| 7,076,655 | B2 | 7/2006  | Griffin et al. |
| 7,191,464 | B2 | 3/2007  | Cromer et al. |
| 7,260,721 | B2 | 8/2007  | Tanaka et al. |
| 7,290,288 | B2 | 10/2007 | Gregg et al. |
| 7,310,732 | B2 | 12/2007 | Matsuyama et al. |

(Continued)

FOREIGN PATENT DOCUMENTS

| JP | 2001-282375   | 10/2001 |
| WO | WO-03/052565 A1 | 6/2003 |
| WO | WO-03/090053 A1 | 10/2003 |

OTHER PUBLICATIONS

Microsoft "Palladium: A Business Overview", http://www.microsoft.com/presspass/features/2002/jul02/0724palladiumwp.asp.

(Continued)

*Primary Examiner* — Gilberto Barron, Jr.
*Assistant Examiner* — Izunna Okeke
(74) *Attorney, Agent, or Firm* — William Stock

(57) ABSTRACT

To provide an information processing apparatus, a server apparatus, a method of an information processing apparatus, a method of a server apparatus, and an apparatus executable program.

An information processing apparatus uses signed integrity values unique to software configuration and asserting integrity of initial codes of a networked server. The server apparatus generates keys used for certifying the server apparatus (S810, S820, S830). One of the keys are certified by a third party to generate a digital signature (S840). The digital signature is attached to the integrity values and the signed integrity values are transmitted to the information processing apparatus for allowing the information processing apparatus to have secure services through the network (S850, S860).

20 Claims, 15 Drawing Sheets

(56) References Cited

U.S. PATENT DOCUMENTS

| | | | |
|---|---|---|---|
| 2002/0026581 | A1 | 2/2002 | Matsuyama et al. |
| 2003/0005118 | A1 | 1/2003 | Williams |
| 2003/0177246 | A1 | 9/2003 | Goodman et al. |
| 2004/0003288 | A1 | 1/2004 | Wiseman et al. |
| 2004/0030887 | A1 | 2/2004 | Harrisville-Wolff et al. |
| 2004/0068650 | A1 | 4/2004 | Resnitzky et al. |
| 2004/0151319 | A1 | 8/2004 | Proudler |
| 2004/0193888 | A1 | 9/2004 | Wiseman et al. |
| 2005/0223221 | A1 | 10/2005 | Proudler et al. |

OTHER PUBLICATIONS

Chris Wright, Crispin Cowan, James Morris, Stephen Smalley, Greg Kroah-Hartman, "Linux Security Modules: General Security Support for the Linux Kernel," USENIX Security Symposium, 2002.

Stephen Smalley, Chris Vance, and Wayne Salmon, "Implementing SELinux as a Linux Security Module," http://www.nsa.gov/selinux/module-abs.html, Dec. 2001.

IBM 4758 PCI Cryptographic Coprocessor. http://www.ibm.com/security/cryptocards/.

Trusted Computing Platform Alliance, TCPA Main Specification v.1.1 b, Feb. 2002. http://www.trustedcomputing.org/docs/main%20v1_1b.pdf.

David Safford, "Clarifying Misinformation on TCPA", Oct. 2002, http://www.research.ibm.com/gsal/tcpa/tcpa_rebuttal.pdf.

Grawrock, David, "LaGrande Architecture SCMS-18," Sep. 2003, URL: http://www.intel.com/technology/security/downloads/scms18-LT_arch.pdf, pp. 1-57.

Maruyama, H., Nakamura, T., Munetoh, S., Funaki, Y., Yamashita, Y., "Linux with TCPA Integrity Measurement", Jan. 28, 2003, URL: http://www.trl.ibm.com/people/munetoh/RT0507.pdf, copy comprises 7 unnumbered pages.

ALLOCATION TABLE OF DOMAINS
FOR TRUSTED DOMAIN SERVICES

| SERVER ID | CREDENTIAL VALUES | PCR VALUES | DOMAIN ID |
|---|---|---|---|
| aaa.xx.b.cc | edfgskg | 245A8CDF | DOMAIN 1 |
| baa.yy.b.dd | edfgskg | 832CFFFD | DOMAIN 2 |
| bcc.zz.k.lm | ibmcorp | CFFADB26 | MOBILE USER |
| ⋮ | ⋮ | ⋮ | ⋮ |

FIG. 6

INFORMATION PROCESSING APPARATUS, A SERVER APPARATUS, A METHOD OF AN INFORMATION PROCESSING APPARATUS, A METHOD OF A SERVER APPARATUS, AND AN APPARATUS EXECUTABLE PROGRAM

CROSS-REFERENCE TO RELATED APPLICATIONS

This application is a continuation of co-pending U.S. patent application Ser. No. 11/001,817, filed Dec. 2, 2004, which in turn claims the benefit of Japanese patent application serial number 2003-403371, filed Dec. 2, 2003. Both of these applications are herein incorporated by reference in their entireties.

BACKGROUND OF THE INVENTION

1. Field of the Invention

The present invention relates to computer network security, and more particularly, the present invention relates to an information processing apparatus, a server apparatus, a method of an information processing apparatus, a method of a server apparatus, an apparatus executable program useful in a networked environment with a means of securely executing programs on remote network environment.

2. Description of the Related Art

In recent years, security of a network system is strongly requested for protecting secret information, important information or computers itself in the network from non-certified attacks. For this purpose, several attempts are proposed such as Palladium (Trade Mark)[1]. In Palladium architecture, platform manufactures would install the so-called Nub in a newly manufactured PC while generating a public key private key pair within a kernel called as the Nub and obtaining maker's certificate for certifying that the PC has a genuine Palladium platform. These processes must be completed during the manufacturing process because the process or the manufacturer is regarded to be the only reliable for making a trusted binding between the Nub and the platform.

The conventional Nub system will have two control points in terms of certification, i.e., certifying the genuine Palladium (Trade Mark) platform and certifying the applications running thereon. The above policy is very similar to some conventional environment provided such as game titles running on some types of platform.

However, in a server technology as well as a networked computer systems, other security policies with further flexibilities are requested, because the server may receive many different types of information processing apparatuses (hereafter referred to simply clients) including computers, PDAs and sometimes cellular phones. The clients as well as servers may be configured to have to talk the Palladium-based platforms or other trusted architecture-based platforms and then the server may include more flexible policy upon providing services with different kind of clients. Therefore, it is required for the server to address the security requirement in more flexible and application independent policy.

The OSGi [3] specifies a framework designed for providing an environment for independent services and offers function for provision, administration and life-cycle managements of such services. Most importantly, the OSGi provides the protection of service bundles against interference from other bundles. Services for user management and for programmatic access control are available as well.

Typically, a platform such as clients and servers contains one single Java Virtual Machine instance, in which one single OSGi Framework instance is executed while executing all of the services. Each service bundle has its own class loader and the class loader is configured to avoid interference of bundle classes. OSGi builds on top of the standard Java 2 security mechanisms.

SUMMARY OF THE INVENTION

In a distributed computing system, some components of an application need to run in a remote platform such as a server or sometimes a client. The remote platform may provide a protected execution domain on demand of users. If these components process sensitive information, a question arises whether the confidentiality and the integrity of the execution are properly protected from other programs running on the same platform. In this case, two typical situations are given below:

(i) Remote Information Processing Apparatus (Client)

Mobile clients such as PDAs and cellular phones becomes more and more powerful. One trend is that a number of service providers, such as online banking, e-ticketing, and online games, try to "push" a part of their applications to the client in order to provide more functionality and better user experience. These applications need to be isolated against each other because some application may have sensitive information that needs to be kept confidential from potential competitors. The service provider who wants to run an application on such a client should verify if the client has enough protection against other applications before sending sensitive data and programs to the server.

(ii) Remote on Demand Server Apparatus

A grid computing environment is one way to realize "on demand" computing. Grid computing nodes are usually maintained by grid service providers who may have different security policies and different levels of security skills. A grid computing user should be able to verify the versions and configuration of the system software running on the node before submitting a job to the node, so that the user can be comfortable about the level of protection that the node provides. In order to address these issues, the following two problems need to be addressed.

(a) Apparatus Trust

This problem is provided how users can assure that the apparatus is the one that user think it is, and that the apparatuses will behave as users expectation. This problem implies that users need to verify identity and integrity of the apparatuses. If the platform is not the one you think it is, the trust relationship is broken. Likewise, if the platform's integrity is compromised, e.g., through viruses, spywares, Trojan horses, or even emulators running underneath the operating system.

(b) Domain Separation and Access Control

The remote server may run multiple programs for serving different applications. Each application must be isolated and protected from other applications. In some cases, applications may want to share some resources with other applications, thus they have to have controls over which data can be shared with other applications and over which data need to be protected. This requirement is also found in multi-application smart cards for example and is addressed by the Java Card architecture and the Global Platform Architecture [2].

The present invention has been made partly dependent on an architecture that makes networked platform fundamentally trust worthier by combining novel technologies with security hardware, secure operating system kernel, and open security protocol to provide end-to-end trust relationships. The integrity values, i.e., PCR values, used in the present invention are generated at the bootstrap sequence of platform started from the system power-on-reset and securely protected from outside invasion by hardware security module called TPM. Then the integrity values of the present invention are quite secure; these quite secure integrity values are combined with two level keys including a public and private key so that the quite secure network environment is provided. The key of one of the level is referred to "Endosement Key" which is provided by hardware manufacturer presenting legitimacy of security module; and the key of another level is "Attestation Integrity Key" certificated by a Trusted Third Party based on the Platform Credential. Both keys are stored and used in the security module. The integrity values are signed by Attestation Integrity Key" and securely transferred to the remote entity.

An object of the present invention is to provide a networked environment with a means of securely executing programs on remote platforms. For example, a service provider needs to execute an application on client apparatuses. Or, a grid computing user may want to submit a job to a remote grid computing node. In these cases, it is allowed to maintain confidentiality and integrity of the execution of remote information processing machines.

Further another object of the present invention is to provide a method for providing high security with a computer in a network and to provide a computer executable program for making a computer to execute a method for providing high security with a computer in a network.

Trusted Bootstrap

When the platform is bootstrapped, the write protected portion of BIOS (called CRTM) "measures" the integrity (SHA1 hash) of the BIOS image and stores the value into the PCRs. The BIOS loads the OS boot loader into memory, concurrently it measures the integrity of the boot loader and stores it into the PCR. Then jump to the OS boot loader. The OS boot loader loads the OS kernel and any related essential files, measures them, and stores the measured values to the PCRs. Then the O S start its boot process. Once a PCR is written, it is impossible to change the value to an arbitrary value, and hence these values will provide an excellent indicator to the integrity of the apparatuses.

Thus following chain of trust is established: the CRTM can be trusted because it was installed at the factory and cannot be replaced. The BIOS image can be trusted, if the PCR values, which indicate the trusted CRTM has updated measuring it, are as expected. The OS boot loader can be trusted, if the PCR register, which the trusted BIOS has updated measuring it, is as expected. The OS kernel and associated files is trusted, if the PCR register which the trusted OS boot loader has updated measuring it, is as expected.

These PCR values can later be inquired (or "quoted") by a remote verifier. This quote message is digitally signed by an Attestation Identity Key (hereafter simply referred to AIK) that is securely stored and executed in the TPM, so the remote verifier can trust the reported values. The verifier matches these values to the known trusted configuration values. If the values match, then the verifier is in fact talking to a genuine Trusted Domain Model platform with a known security policy.

This allows very flexible trust relationships regarding the platform integrity. For example, suppose that security vulnerability was found and corrected in an operating system of a mobile device. A remote verifier who wants to send applications and data to this device only needs to update the database of the trusted PCR values. Or, a more practical solution would be to ask for a trusted third party (validation entity) to maintain such a database. The Service providers may even choose to trust an unpatched platform if the vulnerability is not a serious one considering the value at risk. Different service providers can trust different platform policies; bank applications would require a very restrictive access control policy while network game applications may trust a less strict policy. The service will know the exact policy in effect through an inquiry of the PCR values.

The architecture is abstract because there are a number of ways to implement so-called novel Trusted Domain Model of the present invention which depends on available hardware and software, required level of security, and other novel factors.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 6 shows sample data structures used for the verification and allocation of domains to the clients.

DETAILED DESCRIPTION

The present invention utilizes an architecture provided by TCPA 1.1 is an open industry standard published in January 2001 (now TCPA recognizes the Trusted Computing Group (TCG) as the successor organization to TCPA). TCPA TCG defines an embedded chip (called Trusted Platform Module or TPM) that holds cryptographic keys as well as registers to keep track of software integrity (called Platform Configuration Registers, or PCRs). Trusted Domain Model requires a Trusted Boot and Platform Attestation capability provided by TCPA TCG and Mandatory Access Control policy enforcement by SELinux [3][4][5][6][7][8][9]. In the description below, similar functional parts are associated with the same numerals. When TPM is reviewed briefly, a value of AIK (described hereinafter in detail) proofs that platform integrity and PCR are originated from TPM module rather than verifying the platform integrity. Certification to the value of AIK proofs that the AIK is included in the TPM module. Therefore, depending on particular applications, the values of integrity may be used to issue credential with the AIK after verification of the integrity. In the present invention, particular implementations will be described, but not limited to the described embodiments, the present invention may be implemented in any particular apparatus implementation including comprise AIK, TPM, and CRTM architecture.

1-1. Trusted Domain Model

Figure 1:
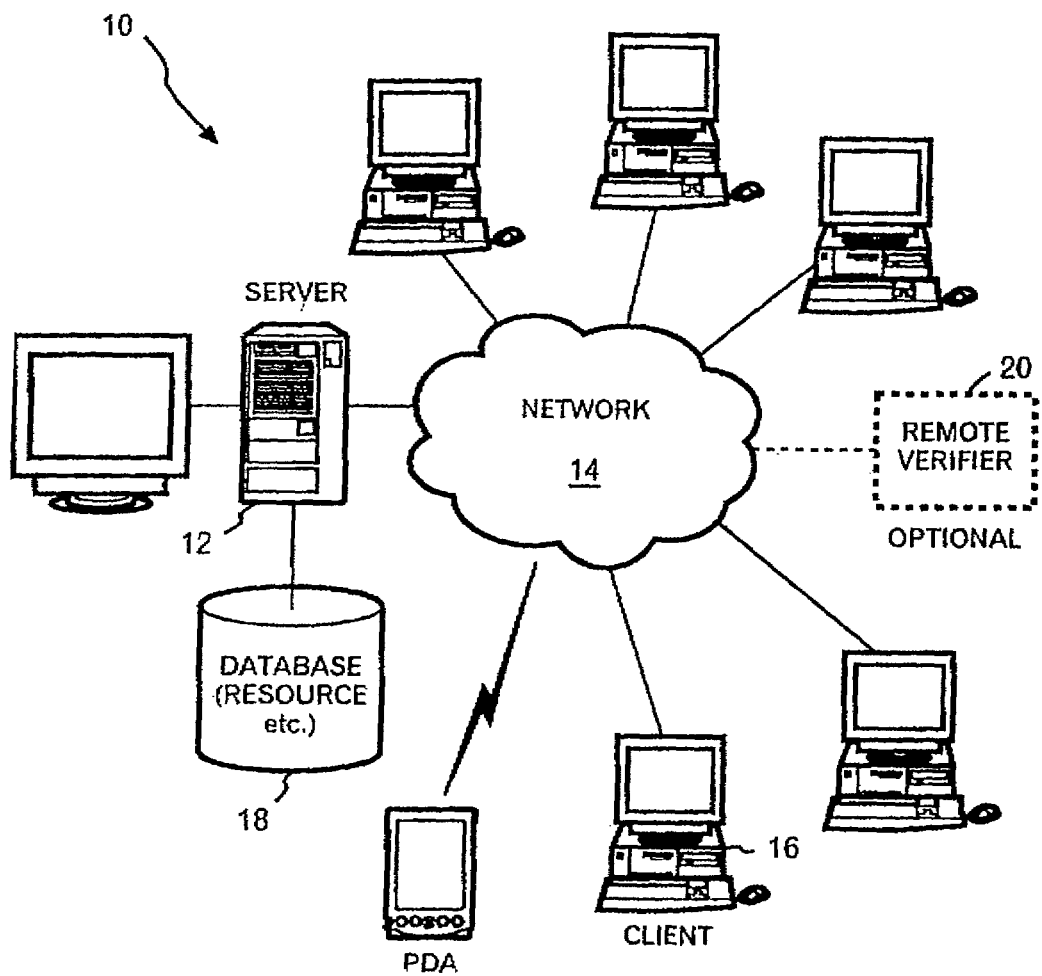
FIG. 1 depicts an exemplary embodiment of the present network system.

FIG. 1 depicts an exemplary embodiment of the network system 10. The network system comprises a server apparatus (hereafter simply referred to as "server") 12 connected to an appropriate network infra 14 such as LAN, WAN, and or Internet. Client apparatus (hereafter simply referred to as "client") 16 are also connected to the network infra 14 such that the clients may request services to the server 12 and may receive response thereof from the server 12. Clients may include information processing apparatuses such as for example, a PDA or a notebook type personal computer, and a cellular phone which are connected to the network infra 14 through wireless or IR communications. A storage device 18 is connected to the server 12 so as to provide services on demand under the trusted protocol. In the following description, it is assumed that the server 12 is configured to be Trusted Platform architecture according to the present invention and the client may be any type of architectures known in the art; however, but not limited thereto, the clients may also be configured as Trusted Platform architecture. When the server 12 receives requests from the clients 16, the server 12 creates or destroys another domain corresponding to the clients for servicing applications stored in the server 12.

1-2. Platform Architecture (Client and Server)

Figure 2:
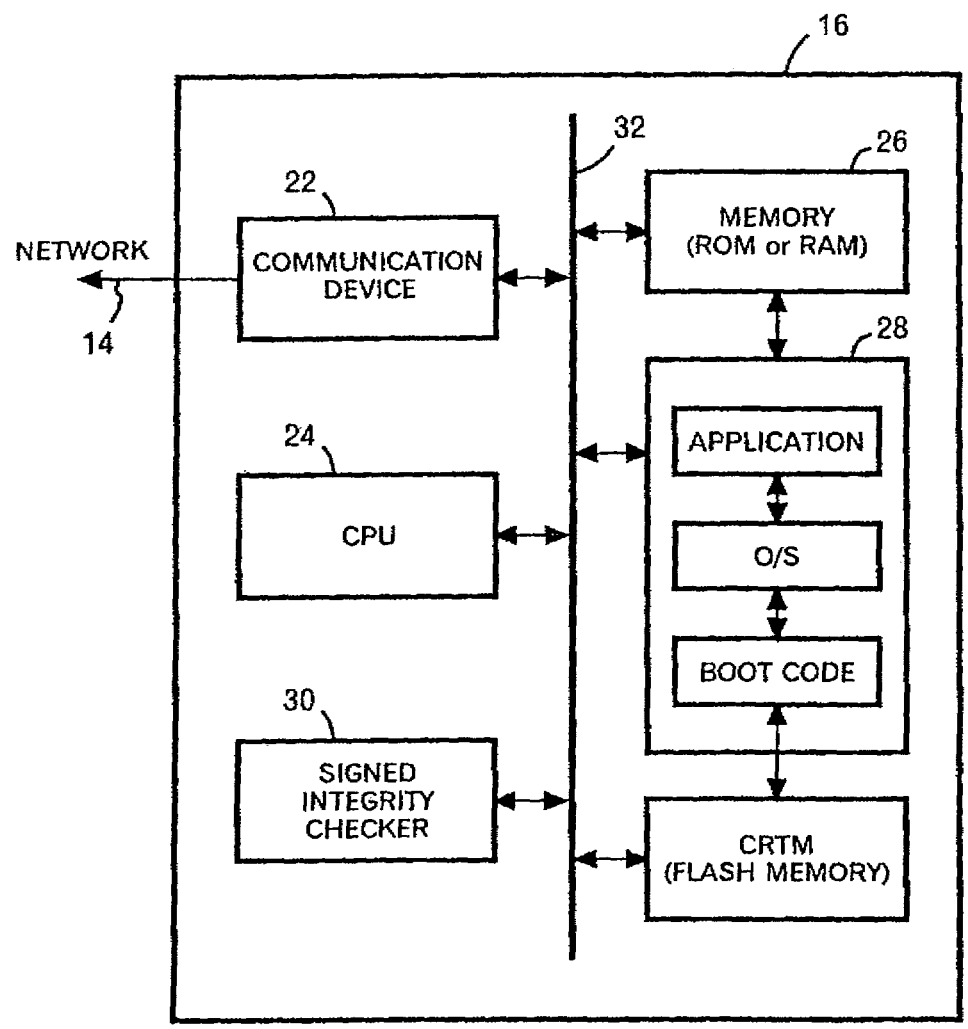
FIG. 2 shows a typical hardware construction of the client according to the present invention.

FIG. 2 shows a typical hardware construction of the client 16 according to the present invention. The client 16 may be connected to the network 14 through wired or wireless connections and generally comprises a communication device 22, a central processing unit (CPU) 24, a memory (ROM or RAM) 26, and a hard disk unit 28.

The hard disk unit 28 stores a boot code, an operating system, and application files etc. The stored software modules and CRTM (BIOS) stored in an adequate memory such as a flash memory are together read into the memory such as RAM or ROM upon request through bus lines 32 to provide normal functions with a user thereof. The client 16 includes the signed integrity checker 30 which checks received signed PCR values together with the digital signature. The function of the signed integration checker 30 is summarized as below:

The quoted PCR values represent the software configuration of the platform at the time of the signing. If there is any question about the PCR values (such as a virus might have been active when the signature was done) by comparing previously stored in elsewhere of the client 16, the signed integration checker 30 is able to examine the PCR values associated with the signature whether there have been known vulnerabilities in the specific platform configuration (BIOS and OS revisions, configuration files, antivirus definition files etc.). If there is not found correspondence between the PCR values stored and the recently received PCR values, the client 16 terminates transaction between the server.

Figure 3:
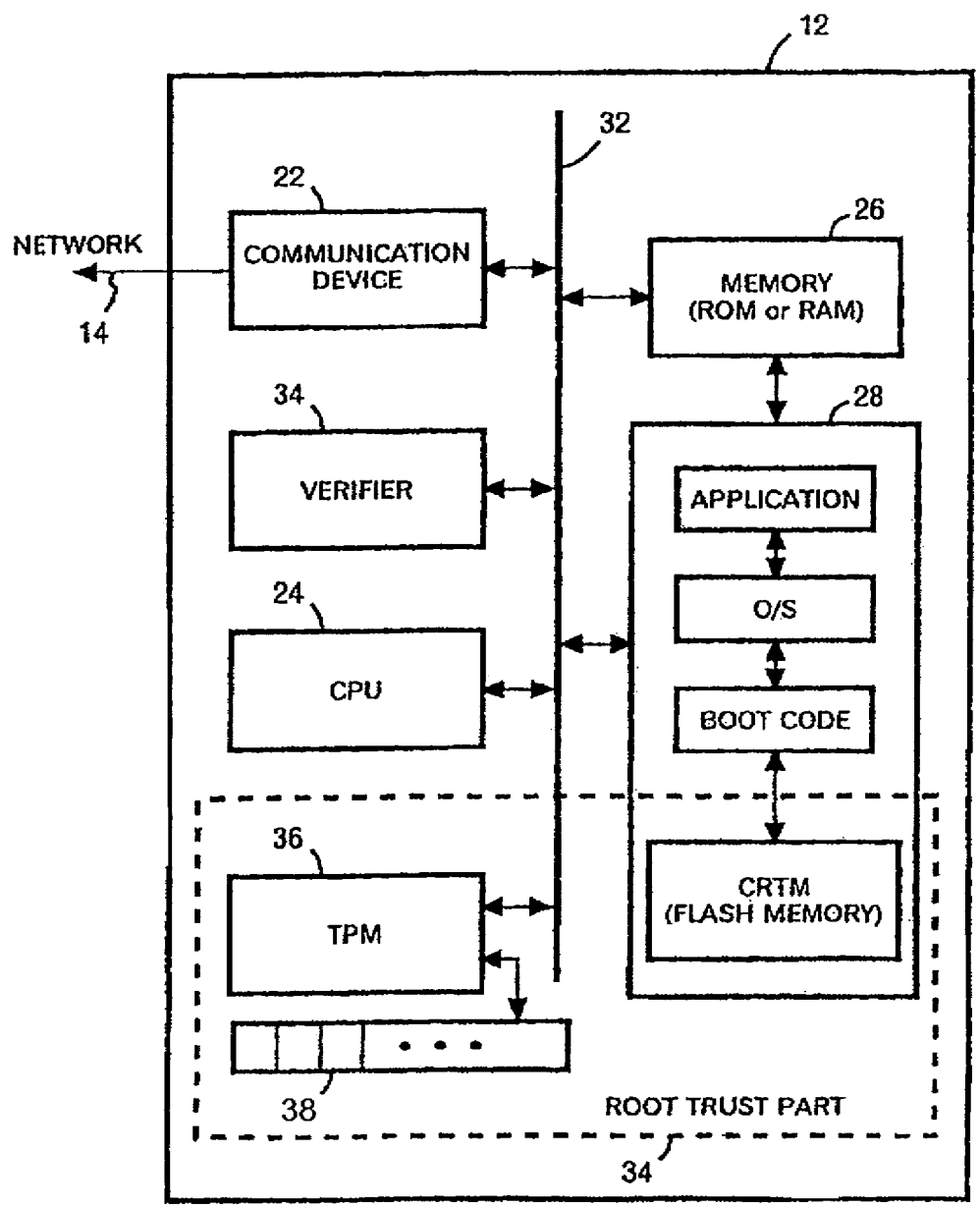
FIG. 3 shows a typical hardware construction of the server configured to provide the Trusted Domain Service.

FIG. 3 shows a typical functional construction of the server 12 configured to provide the Trusted Domain Service. The server 12 comprises the root trust part 34. The root trust part 34 further comprises a TPM 36, a register array 38 or storing PCR values of the server upon starting or resetting thereof and CRTM. The TPM 36 and the register array 38 are essential part for generating the integrity report (PCRs) that signed by AIK as described herein below. Upon receiving the attestation requests from the client for services, the root trust part 34 send the PCRs with signature of the AIK to clients so as to provide secure domain accesses.

2. Trusted Domain Function 2-1. General Protocols

Figure 4:
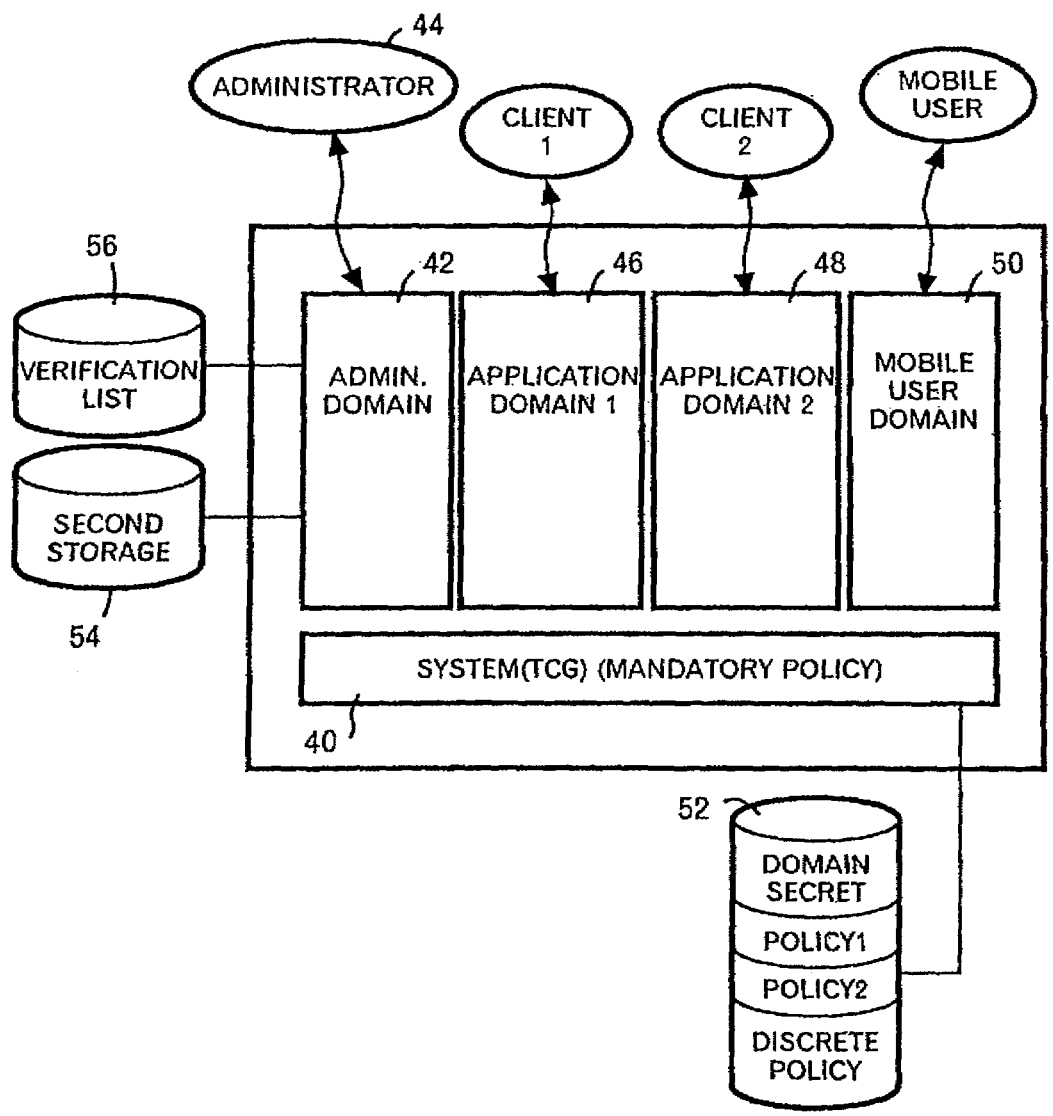
FIG. 4 shows a schematic structure of the trusted domains created in the server.

FIG. 4 shows a schematic structure of the trusted domains created in the server 12. The server 12 is based upon a TCPA TCG system 40 for serving secure domain services with a Mandatory Access Control policy. The domains created in the server space are domains such as the administrative domain, application domains, and a user domain. The administrative domain 42 is accessed with the system administrator 44 so as to administrate the Trusted Domain Services together with the root trust part (not shown). The application domain 1 (46), the application domain 2 (48) and the mobile user domain 50 are created after verifications of credentials transmitted to the clients and allows the clients to enjoy the trusted domain circumstance. Each of the domains is associated with secret data and or the policy stored in an appropriate storage device 52 so as to protect privacy policies of users. The server is controlled by a secure operating system (sometimes called as Trusted Computing Base, or TCB), which enforces the system-wide Mandatory Access Control Policy. Each domain has its own Discretionary Access Control Policy.

Although the TCB needs to be trusted and it should be thoroughly verified, it is not realistic to assume that no vulnerability will ever be found in the TCB. The present invention provides a way to update the TCB if there is any security problem. This means that there must be an administrative entity who can modify the TCB if necessary. This requires the server or clients (if necessary) to have novel mechanism to update the TCB; however this mechanism is may be quite sensitive ones because a compromise on this administrative entity could break all the security assumptions.

To cope with the objectives described above, the present invention introduces a special domain called administration domain 42. The administration domain 42 is the only domain that is allowed to (1) create destroy an application domain on demand from the clients and (2) update the TCB, including updating the mandatory AC policy. Because the administration domain is allowed to modify the mandatory AC policy, it is necessary to prevent that a malicious owner of administration domain bypasses the mandatory AC policy. To prevent this attack, any currently running domain instances should be terminated or suspended with all the execution status being saved to a secondary storage 54 in an encrypted form before the mandatory AC policy is modified. After the modification, the entire platform is reset. After rebooting the server, the PCR contains a new value reflecting the new configuration of the TCB. Each domain owner performs the domain instantiation protocol again to make sure that the new system configuration can be trusted. Only if it is trusted, the domain owner will provide an authorization of using the domain secret.

Note that the administration domain 42 cannot access domain secrets of another domain at any time because (1) when the TCB is not in a trusted state (i.e., no domain instance is running, or the electric power is off), the domain secret is protected by the TCPA chip as described in the next section, and (2) when the TCB is in a trusted state after recovered and a domain instance is running, it is protected by the mandatory policy. It cannot access domain private data of another domain unless explicitly allowed by the domain owner. In this respect, administration domain is different from Unix superuser.

The server according to the present invention may host multiple applications. Each application runs in its protected execution environment, or domain, on the platform. It is assumed here that a domain belongs to its domain owner. A domain owner is a remote client that determines the security policy of the domain. In the case of grid computing, a domain owner would be the user of the grid computing service. In the case of mobile platforms on which multiple applications are running, the domain owner would be a remote service provider (e.g., e-ticket service) who pushes application and data to the client and or mobile platforms or clients.

On the administration function according to the present invention, every non-system program runs in a domain. The domain protects data and execution from other domains on the server or the platform. If a client (domain owner) decides that the domain can share some of its resources with other domains, it can do so by setting appropriate access control policy.

In the present invention, two levels of access control policy are implemented, that is;

(1) mandatory access control policy that is enforced system-wide on all the domains of the server (platform) and (2) discretionary access control policy that can be controlled by each domain owner or client.

The mandatory policy provides strong protection of critical resources (such as cryptographic keys) even if applications running in the domain have security vulnerabilities. On the other hand, the discretionary policy allows flexible data exchange among applications if so desired.

According to these two levels of access control, a domain has two types of protected data. Domain secret is data that is protected by the TPM's hardware and subject to the mandatory policy. An encryption key that is used for encrypting the domain's data in the hard drive is an example of domain secret. On the other hand, domain private data is subject to discretionary policy and can be shared by other applications if the domain's discretionary policy allows doing so. In the mobile device scenario, the user's address book would be domain private data that is shared by multiple applications.

Depending on the type of the clients, there may be different types of domain. Normal applications that are provided by application service providers run in Application Domains. The administration domain 42 is an essential part for executing administration tasks. All other domains are "owned" by a domain owner. User domains are owned by the device user. All the data and programs, which a user owns, are in the user domain to assure private data.

Figure 5:
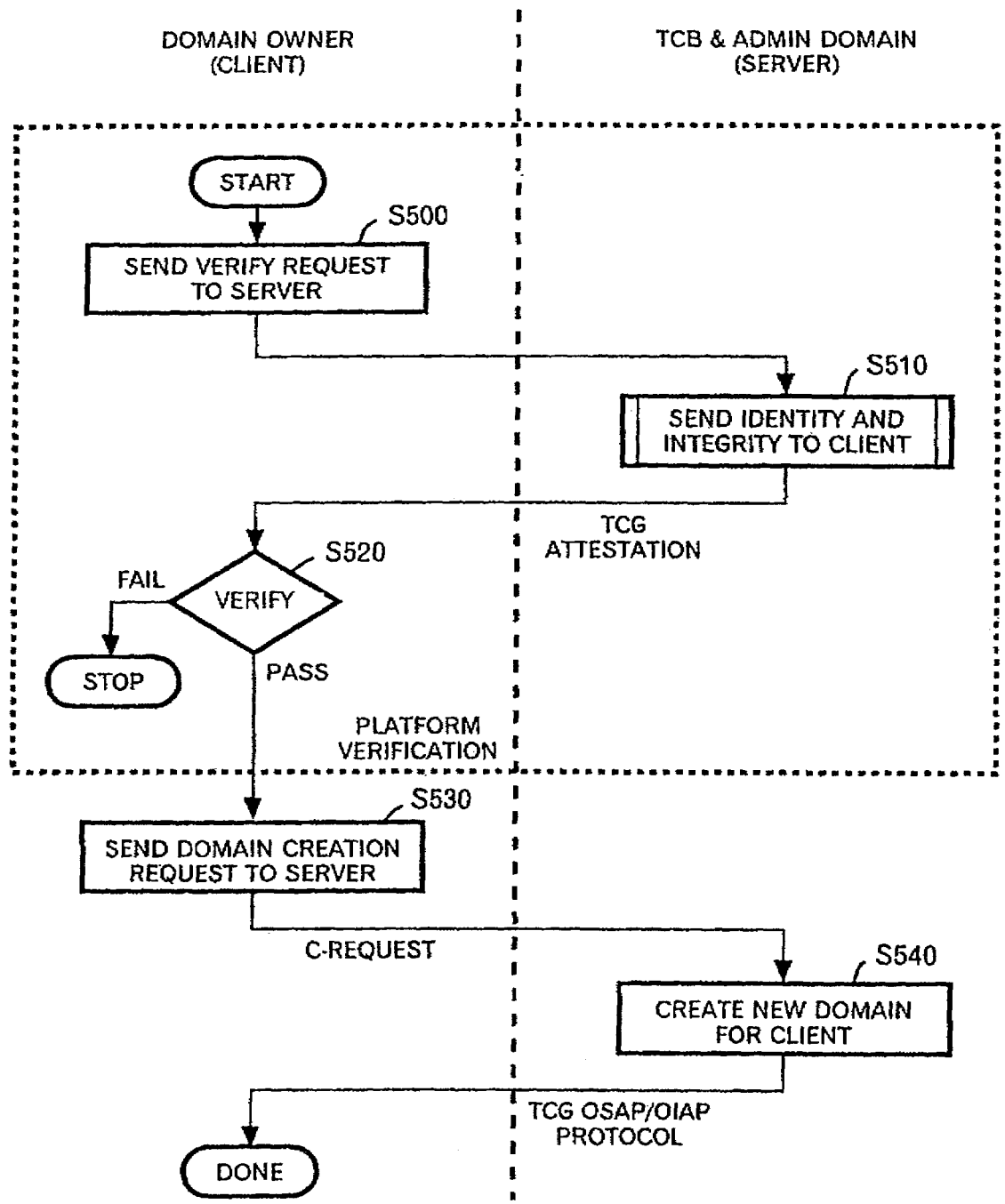
FIG. 5 shows the process between the client and the server till a new domain to the client is created.

The administration domain executes creation or destruction of domains upon receiving requests from clients or domain users. FIG. 5 shows the process between the client and the server till a new domain to the client is created. As shown in FIG. 5, the client sends the verify request in the step S500 to the server or the server. The server receives the request and the server sends to the client the result of attestation (TCG Attestation) in the step S510 as signed integrity values.

In the step S520, the client received the signed integrity values determines whether or not the result of the attestation is acceptable depending on the signature and or the PCR values. If the result of the attestation is negative, further transactions are terminated in the step S530. If the result of the attestation is positive, the process proceeds to the step S540 and the client sends to the server the request for domain creation (hereafter referred to c-request for easiness of the description). When the server receives the c-request, the server creates a new domain for the corresponding client while allocating a unique domain id in the step S550 such that the clients sent the c-request dominates the new domain exclusively.

FIG. 6 shows sample data structures used for the verification and allocation of domains to the clients. The data structure shown in FIG. 6 may be stored, for example, in the verification list shown in FIG. 4; however, but not limited thereto, the data structure may be stored in elsewhere of the client 16 in order to manage allocations of domains of the server. When the server receives the request from the client, the server sends to the client the AIK credential as the signature together with the integrity values. The AIK credential may be generated from public keys provided by a certified third party and certified credential values may be stored beforehand in elsewhere of the server, or alternatively, it may be possible to obtain the certified credential values from the remote third party that accumulating certified digital signature, i.e., credentials upon receiving the request from the client.

The table shown in FIG. 6 includes the server ids, the credential values, the PCR values and the domain id are listed in lines. The PCR value is the essential integrity value for the certification of the present invention which is uniquely determined by configurations of the platforms such as the server. The integrity value (PCR) uniquely determined by the configuration may be used as single value or may be used a set of integrity values. Details of creation of the PCR values will be discussed later. The client 16 may enjoy the Trusted Domain Services according to the allocation table shown in FIG. 6.

Figure 7:
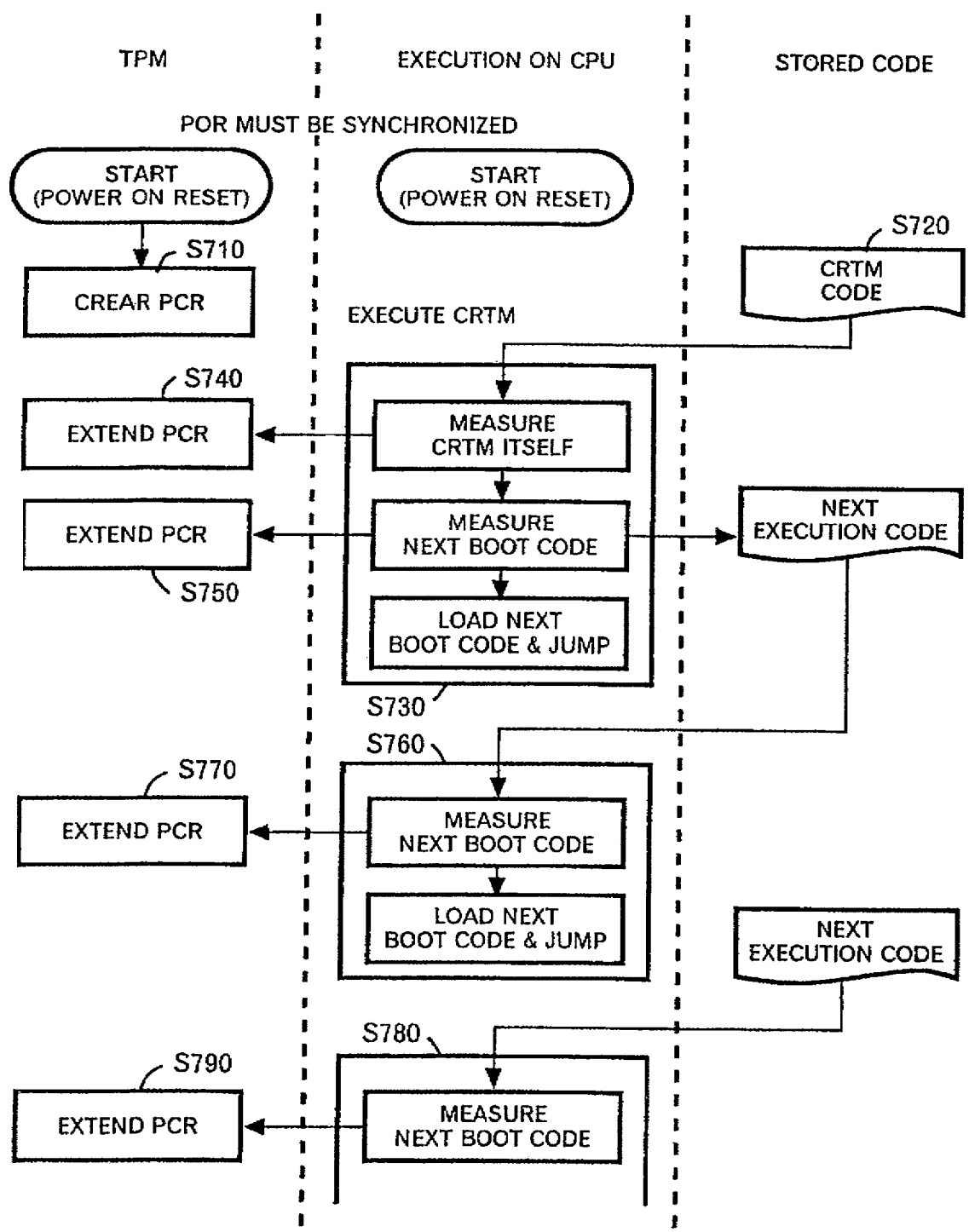
FIG. 7 shows a process for generating integrity values unique to hardware integrity.

FIG. 7 shows a process for generating the integrity values (PCR). In FIG. 7, processes in TPM, CPU, and invocations of stored codes are described. When a server is started or reset, PCR registers in TPM are cleared in the step S710. The server invokes CRTM code (BIOS) into another memory area from ROM or a flash memory and executes CRTM code in the step S720 and stores hashed values of CRTM code in any one of PCR registers in the step S740 and invokes the next execution code in the step S730. Prior to invoking of the next code in the step S730, the computed PCR value is stored further another register in the step and S750. PCR values are extended until all of the necessary codes in the setup procedure is completed as described in the steps S760-S790.

The values of the PCR represent the integrity of the codes for initial setup and the written PCR values can not changed other values in the sequence of the server until the server will be powered on after the shutdown or reset. Therefore, the PCR values assure the integrity of the server. When the present invention is applied to the client machine, the same attestation process can be progressed in the client so that securities within the network may become more enhanced. In these embodiment, the implementation of the client will include the TPM module or tip with suitable configuration to the client.

Figure 8:
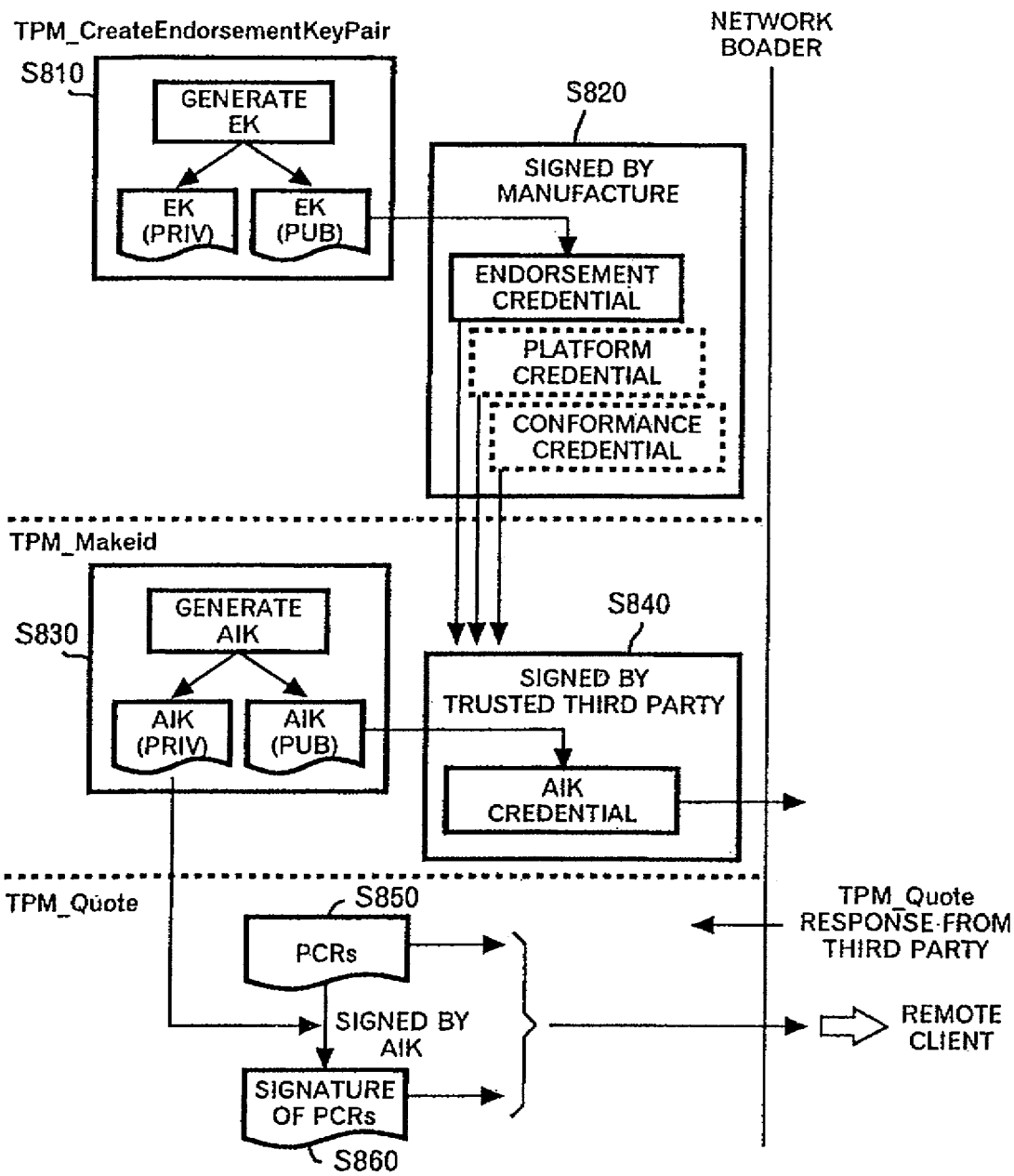
FIG. 8 shows a function of TPM of the client for enabling the trusted domain access to the server.

FIG. 8 shows a function of TPM of the server and client (if the client is implemented as is) for enabling the trusted domain access to the client. TPM executes TPM_CreateEndosementKeyPairTPM-makeid and TPM_Quote. The TPM_CreateEndosementKeyPair generates endosement keys based on known techniques which comprise a private key and a public key in the step S810. When the endosement key is generated, a digital signature of the responsible manufacturer is attached to the endosement key in the step S820. The endosement key assures the confidence of TPM. Also an AIK used for providing the digital signature for the integrity values PCR is generated in TPM_makeid operation and AIK comprises also a private key and a public key in the step S830. When the AIK public key is certified by the third party, the AIK is used as the certified credential and also as the digital signature attached to the PCRs in the step S840.

The code TPM_Quote generates the signed integrity values to be sent to the remote client (TCG Attestation) in FIG. 5. The TPM_Quote invokes from the PCRs and attaches a digital signature with the AIK credentials to generate signatured PCRs in the step S860. The code TPM_Quote next send the signed PCRs as the request to remote client through the network infra as shown in FIG. 8 such that the client may execute the PCR check operation.

2-2. Signature with Integrity Measurement Values

As described above, the results of integrity measurements are stored in the PCRs inside the TPM and are reported by the quote function. Actually, this usage of the quote function is not limited to the response to the server challenge. One of the ways to use the platform integrity metric is to include the metric in a digital signature. To implement the above functions to the platform, the inventors defined a signature algorithm for XML signing functional part that includes the function to attaching the signature to the PCR values.

2-3. Signing Functional Part (Implemented by Execution of Signing Algorithm)

The inventors have defined our new signature algorithm as a concatenation of a structure representing the current PCR values (quoteInfo) and the signature value on the structure as follows.

SignatureValue=quoteInfo|SignatureOnQuoteInfo

The first part of the signature value (quoteInfo) is a 48 byte data object as defined by TCPA_QUOTE_INFO as follows:

```
typedef struct tdTCPA_QUOTE_INFO{
TCPA_VERSION version;
BYTE fixed;
TCPA_COMPOSITE_HASH digestValue;
TCPA_NONCE externalData,
} TCPA_QUOTE_INFO;
``` in which version is TCPA version as defined in Section 4.5 of TCPA 1.1b. Specifically, its first two octets may be selected be 0x01 and 0x01.

The "fixed" is always the ASCII string "QUOT". The "digestValue" is the result of the composite hash algorithm using the current values of the requested PCR indices. The "externalData" is the SHA-1 hash of the octet stream of the canonicalization of .SignedInfo.

The second part of the signature value is the actual RSASSA-PKCS1-v1.5 signature value on the TCPA_QUOTE_INFO data structure. This part is at least 256 byte long because the length of an attestation key is at least 2048 bits.

2-4. Verification Algorithm

In an particular embodiment explained, a verifying application of XML Signature with TCPA PCR Values needs to split the base64-decoded .SingatureValue. into two parts. The first part consists of the first 48 bytes of the octet string and the second part is the rest. The verifying application verifies the following things.

The first part contains a valid TCPA_QUOTE_INFO structure. This means the first two octets of the version field must be 0x01 and 0x01, and the fixed field must be ASCII "QUOT".

The externalData field of the first part is the SHA-1 hash value of the canonicalized .SignedInfo.

The second part may be the RSASSA-PKCS1-v1.5 signature of the first part according to the given public key.

The verifying application can then verify the PCR values (the digestValue field) in the TCPA_QUOTE_INFO structure against known trusted values. If the value is known to be trusted, the server can conclude that it is communicating with a trusted platform. Otherwise, the server may reject the request according to its policy.

2-5. Implementing PCR-Enabled Signature in JCE

In the present invention, the above signature procedure has been implemented as a new signature algorithm (called "SHA1 with RSATcpa") in a Java Crypto Environment (JCE) provider. This way, the application does not need to be modified to use the signature with PCR values.

3. Creating and Destroying Domain Instance

Figure 9:
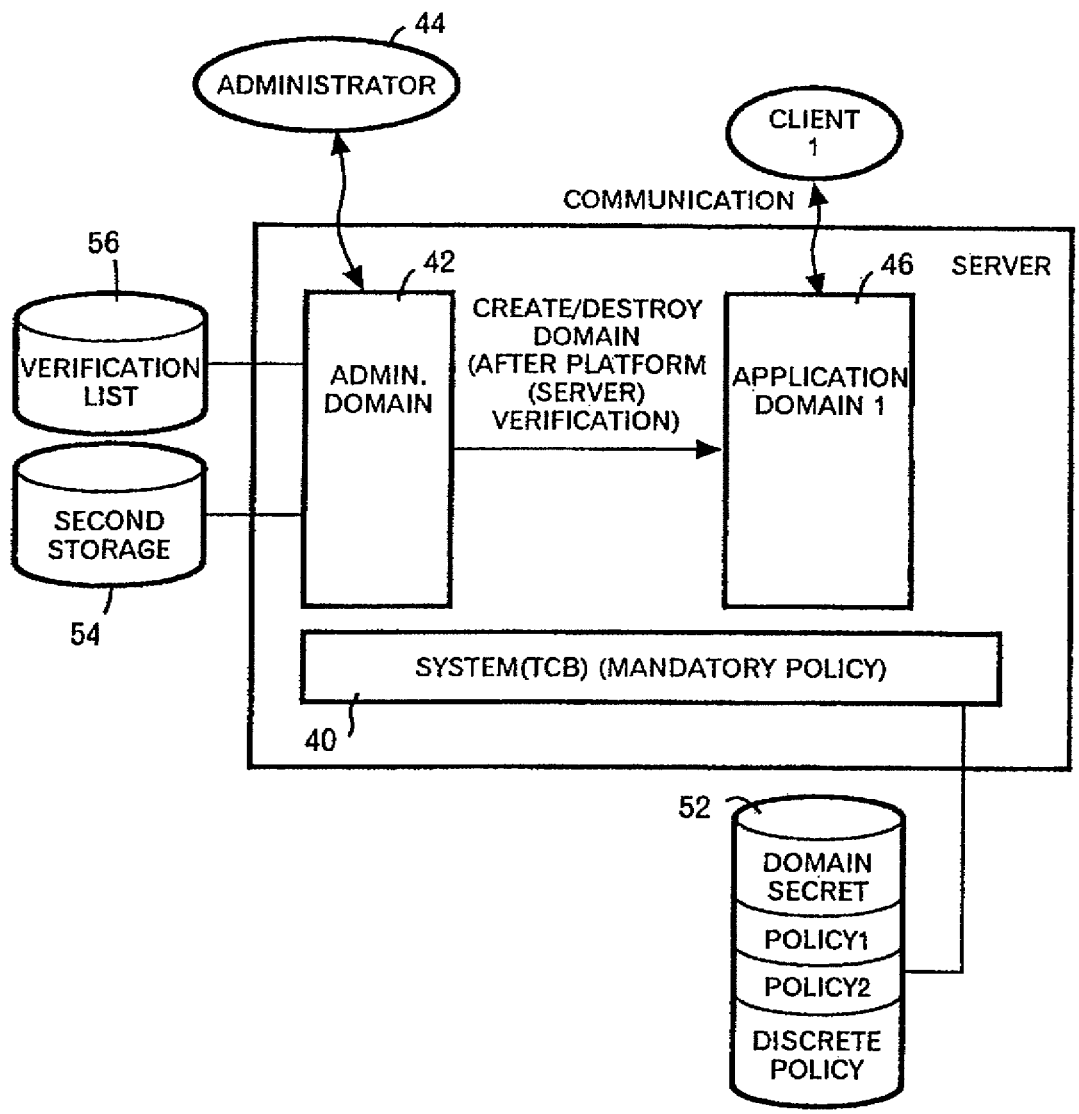
FIG. 9 shows the creation of a new domain upon receiving the request from the client.

FIG. 9 shows the creation of a new domain upon receiving the request from the client. When the server receives the request, an appropriate part such as the verify part or the communication part of the server analyze the request to obtain the AIK credential and the signed PCRs. Then the verify part looks-up the verification list or table and determines that the received request should be allowed to access to the server. The server returns a response packet including the result of the look-up. Next the client sends the c-request for creation of a new domain depending on the verification of the step S530 of FIG. 5 to create the exclusive new domain such as the application domain 1 (46) for the client as shown in FIG. 9.

When the client creates a new domain instance on the server, it is important to make sure that the platform is indeed trusted. This trust comes from the Trust Layer, which provides the verifiability of the identity and the integrity of the platform. As shown in FIG. 5, the client first verifies the identity and integrity of the server using the server's PCR values which may be transmitted together with the result of TCG Attestation shown in FIG. 5 before instantiating its domain. Unless the client is satisfied with the versions of the software stack and also the contents of the mandatory policy, the client should not proceed.

This domain instantiation protocol is also a mutual authentication protocol, so that the platform can verify the domain owner's identity. Any trusted platform must not authorize the use of the domain secret before the owner's identity is verified. Once the domain owner is satisfied with the identity and integrity of the platform and the platform is satisfied with the client's identity, the client conducts one of the authorization protocols (either Object Specific Authorization Protocol or Object Independent Authorization Protocol) so that the client can use the domain secret, which usually contains an encryption key (root key). If the domain has persistent data that are stored in a secondary storage, the platform TCB imports the external data that is encrypted using this encryption key.

After finishing the execution of a program in the domain instance, the domain instance is destroyed as described in FIG. 5. Here, all of the memory contents and the temporary files on the system are erased.

Figure 10:
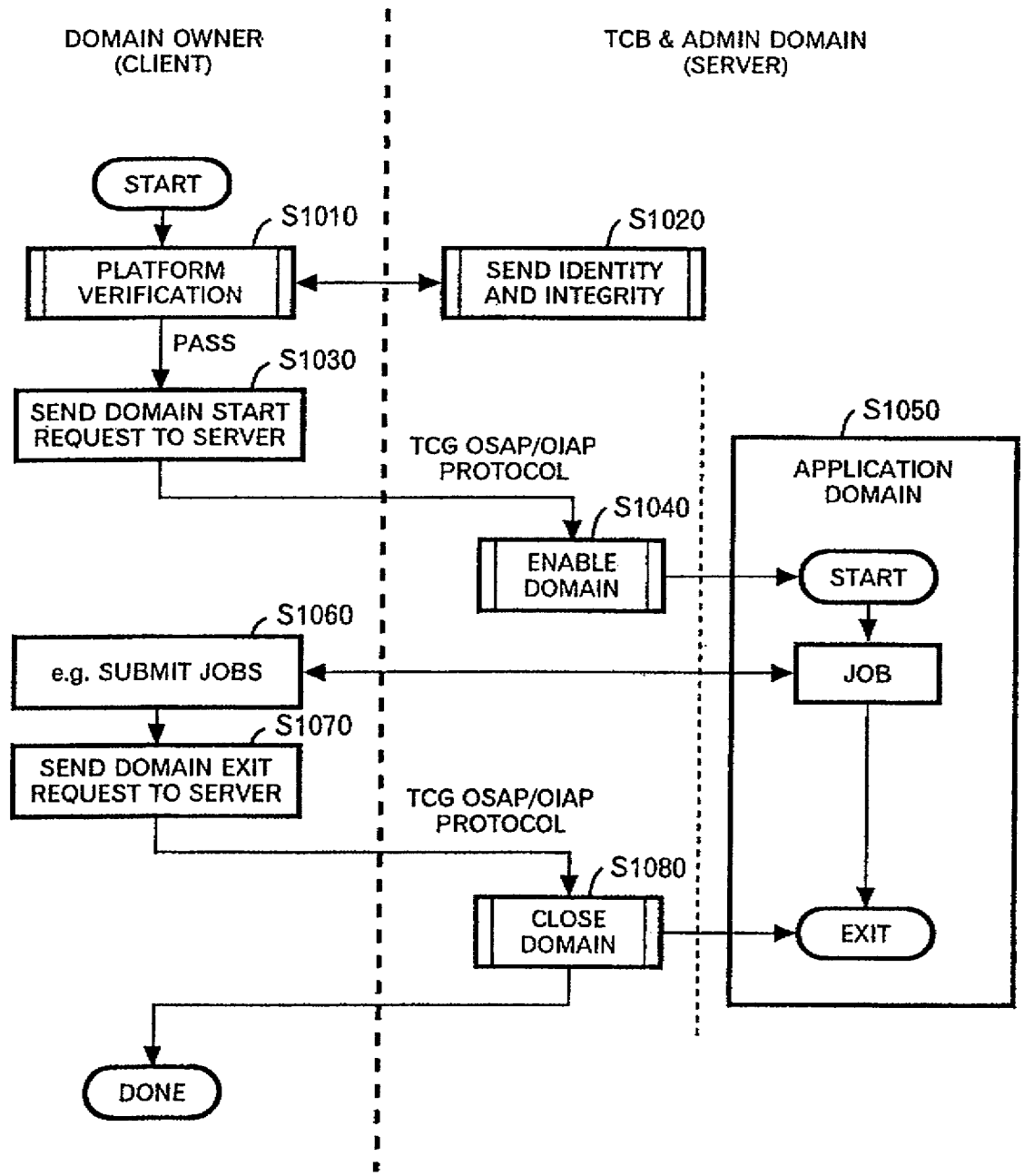
FIG. 10 shows the process for instantiating the new domain between the client and server.

FIG. 10 shows the process for instantiating the new domain between the client and server. The process described in FIG. 10 completes the verification protocol between the client and the server in the steps S1010 and S1020. If the verification protocol is successfully passed, next the client send the domain start request (c-request) to the server in TCG OSAP OIAP protocol in the step S1030. The server receives the c-request and instructs to create a new enable domain for the client in the step S1040. Then the instance of the domain is created in the step S1050.

The instantiated domain and the client communicates transaction with respect to jobs submitted and corresponding results in the step S1060. When the client obtains his or hers results objected, the client sends the request for domain exit to the server by TCG OSAP OIAP protocol in the step S1070. The server receives the request for domain exit and instructs the termination of the corresponding domain in the step S1080. The server further sends an acknowledgment of close of the domain to the client to complete the protocol according to the present invention.

When the domain instance is not present, the entire domain private data stored in the persistent storage is encrypted by the domain key. Therefore, nobody can access the domain's private data while a domain instance is not present. When a domain instance is present, the system is a secure state because the domain owner has checked the integrity of the TCB at the time of instantiation. Therefore, the domain owner knows that the domain private data is properly protected by the TCB.

4. Protecting Domain Secret with TCG Protected Storage Hierarchy

Figure 11:
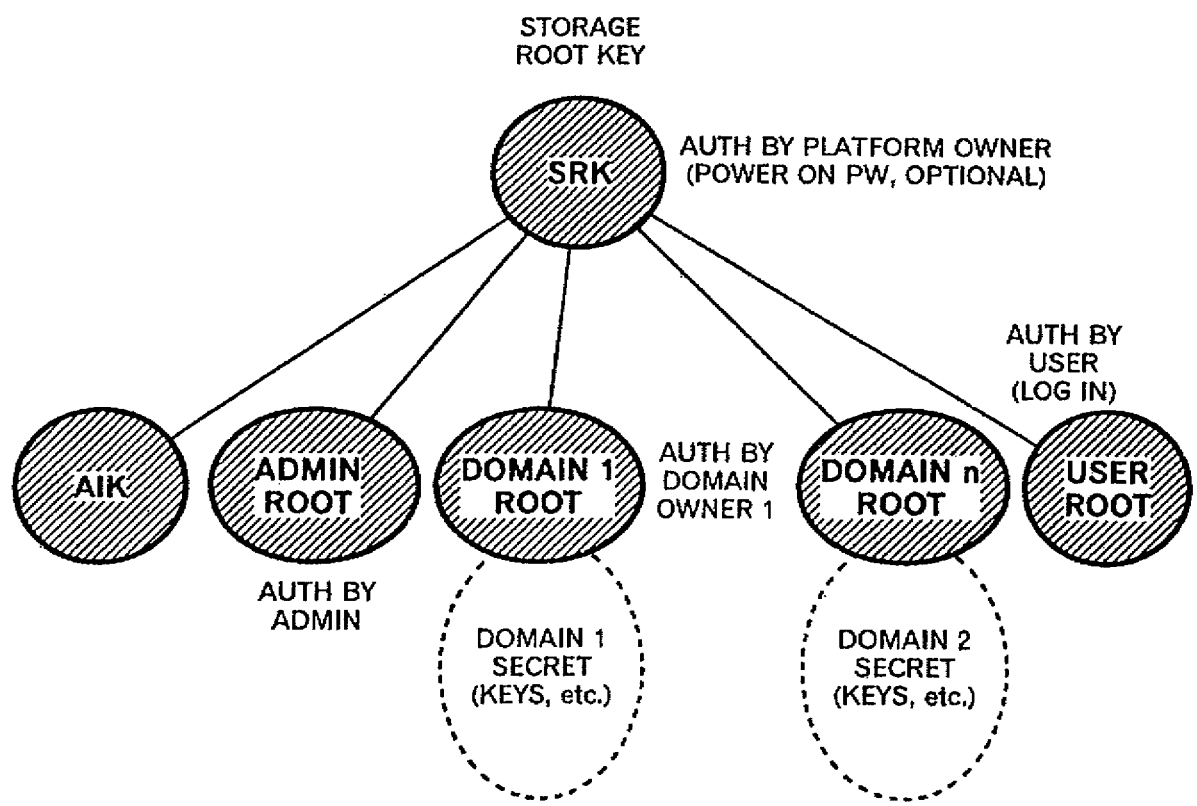
FIG. 11 shows essential data protection of each of the domains.

FIG. 11 shows essential data protection of each of the domains. When the platform is shut down or is in an untrusted state, the domain secrets need to be securely protected. This is done by using the TCG's Protected Storage Hierarchy. As shown in FIG. 10, TCG's protected objects are organized as a tree. The root node, called Storage Root Key (SRK), is the only key that is permanently stored in the TPM. Because the TPM is intended to be an inexpensive device and has a limited internal memory, all the other keys are kept outside of the TPM by encrypting their parent key when they are not used. When using a key, all its ancestor keys may be needed if they are not already loaded in the TPM. In the present invention, each domain is assigned a subtree under the SRK. This subtree holds the domain secret of the domain. This means that the domain secret cannot be used unless the subtree's root key is available to load the subtree to the TPM.

Each key is associated with its authorization secret, which is a 160 bit data. The TPM requires a proof of possession of this secret when a key is to be used. In our model, when the domain owner logs in to the platform, the domain owner proves that he she knows the authorization secret of the key. Using TCG's Object Specific Authorization Protocol (OSAP), this can be done without revealing the secret even to the TCB.

Figure 12:
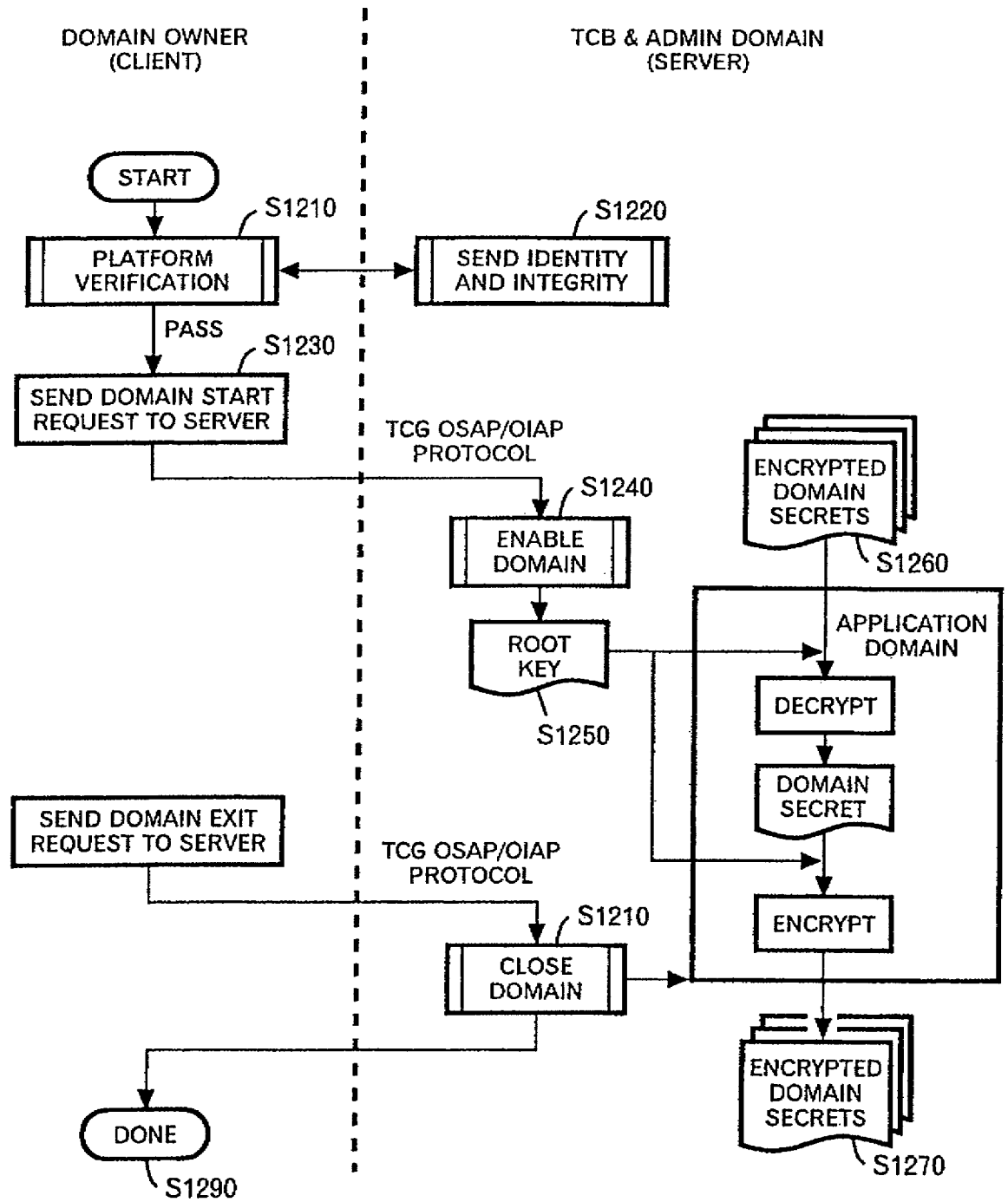
FIG. 12 shows the process for protecting the domain secret data according to the present invention.

FIG. 12 shows the process for protecting the domain secret data according to the present invention. The protection process first executes from the steps S1210 to S1240 the creation of a new domain. Then proceeds to the step S1250 to obtain a root key after completion of the verification process. In the accepted domain, the secret data in encrypted form necessary for the created domain are invoked from an adequate storage area into the domain and provided to proceed the requested job after the description by the root key in the step S1260. The decrypted secret data are, if necessary, encrypted again in a predetermined process and stored in an appropriate storage area administrated by the administration domain in the Step S1270, and then the instance of the domain is destroyed to complete the transactions between the client and server in the step S1280-1290.

5. Enforcement of Domain Separation

Providing domain separation and enforcing access control policies can be realized in many different ways in actual implementations. For example, UNIX access control and Java's JAAS are software-based technologies that provide a certain level of protection. Middleware such as WebSphere provides additional separation at the application level. In many situations, these domain separation models provide adequate level of application protection. However, if the applications need stronger protection, we need a stronger domain separation mechanism. It is well known that the complex software such as COTS (Commercially Off-The-Shelf) operating systems and middleware tend to have many security bugs even after careful examination by experts. There seem to be two approaches to remedy this problem.

One is to employ hardware support combined with very small, thoroughly examined trusted software. For example, latest high-end processors have an additional privilege level that is higher than the ordinary kernel mode. A trusted microkernel or hypervisor running in this mode can provide very secure isolation between domains. Such a hypervisor has minimal code only and therefore contains fewer residual vulnerabilities.

6. Implementation Variation

The other approach is to harden the existing operating systems either through a good engineering and certification (such as Common Criteria certification) or by adding additional protection in the operating system kernel (sometime called reference monitor). The Trusted Domain Model architecture allows any of the above approaches depending on the required level of security.

The Trusted Domain architecture of the present invention can be implemented by properly combining existing technologies. In this section we show a design based on PC with TPM chip and Linux Security Module. The overall structure of this implementation is shown in FIG. 12.

6-1. Linux Kernel Measurement in Boot Loader

IBM's TCPA-enabled system currently supports measured bootstrap in the sense that its un-modifiable part of the BIOS measures the remainder of the BIOS and the BIOS also measures the MBR (Master Boot Record) of the bootstrap device (usually the hard drive). However, no further measurement is done for any commercial operating systems today to our knowledge.

For measuring the integrity of an operating system, an OS boot loader should take the responsibility according to the TCPA PC Specific Implementation specification because the BIOS does not usually directly load the operating system. Instead, the BIOS loads a portion of a boot loader (which resides in the MBR) into the memory and transfers the control to the loaded code. In order for the boot loader to properly measure the integrity of the operating system, the boot loader needs to satisfy the following requirements:

(1) If the boot loader has multiple stages, an executing stage must be able to measure the next stage and extend the PCR value prior to transferring the control to it.

(2) The boot loader should be able to measure the O S image and all security-critical configuration files before transferring the control to the O S. This implies that the boot loader must have at least a partial implementation of the file system on which these files are stored.

For Unix-like operating systems for PC, several boot loaders are available now under the GPL license, such as LILO (Linux LOader), GRUB (GRand Unified Bootloader) and XOSL (Extended Operating System Loader). In the embodiment explained, GRUB for our prototyping of a trusted boot loader is adopted because it is widely used and it looked feasible to modify it so that the modified boot loader satisfies the above requirements.

6-2. Boot Sequence in GRUB

Figure 13:
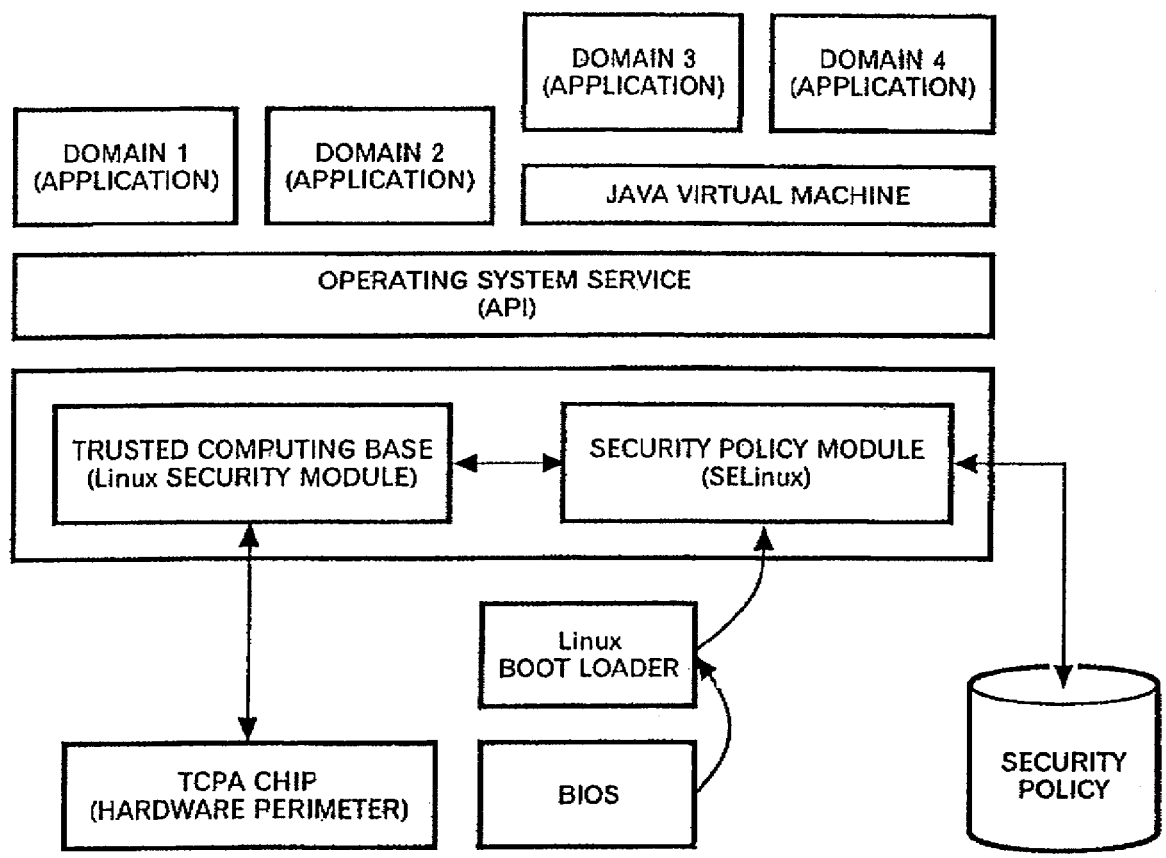
FIG. 13 shows the detail of the boot sequence of the GRUB is divided into multiple stages.

FIG. 13 shows the detail of the boot sequence of the GRUB is divided into multiple stages, that is, Stage 1, Stage 1.5, and Stage 2 (FIG. 13(*a*)). This is due to the restricted size of disk space in the current PC Architecture. Stage 1 code was designed to fit in the MBR space that is 446 bytes long. Stage 1.5 contains the file system implementation, so it is significantly larger (approximately 10 KB) and placed in the sectors right after the MBR which are normally unused space. Since Stage 1.5 can now access the file system, Stage 2 code and the GRUB configuration file can be placed anywhere in the file system.

BIOS loads Stage 1 (MBR) data from the hard drive into memory and jumps to the starting point of Stage 1. Stage 1 loads the first sector of Stage 1.5 and jumps to it. This Stage 1.5 loads the rest of Stage 1.5 sectors into memory and jumps to it. Now Stage 1.5 has filesystem interface and finds and loads Stage 2 into memory, and then jumps to the start address of Stage 2. At this point, GRUB checks the configuration file and displays an O S selection menu to the users. After the user selects an O S, GRUB loads the selected O S image into memory and starts the O S boot process.

6-3. Measurement Steps in GRUB

FIG. 13 also shows the code for measurement step in GRUB (FIG. 13(b)). The chain of measurement must also reflect this bootstrap sequence: The Stage 1 must measure the first sector of the Stage 1.5, and the first block of the Stage 1.5 must measure the rest of the Stage 1.5. Then the Stage 1.5 measure the stage 2, which finally measures the operating system. Because the Stage 1 and the first sector of the Stage 2 have a severe size limitation, inserting integrity measurement codes to these stages was our major challenge.

Stage 1 code, which is loaded from the MBR, has to measure the first sector of the Stage 1.5. This means that we must compute the hash of the loaded sector and call the TPM_Extend function of the TPM. However, the original GRUB code already used up almost all of the 446 bytes allocated for the MBR. Fortunately, a BIOS service could be called that does exactly this. Still, the present invention may be implemented to discard the support of an older drive format (the C.H.S. mode as opposed to the LBA mode).

Basically, each step of a trusted boot must 1) load the next stage data from the hard drive into memory, 2) measure the loaded memory image and extend the PCR value using the measured value, and 3) jump to the entry point of the next stage.

The next stage, the first sector of Stage 1.5, has the same space limitation as Stage 1 and was modified in the almost same way as Stage 1. The remaining part of Stage 1.5 has no such space limitation and it was easier to add the capability of measuring the next stage, Stage 2.

Stage 2 is responsible for measuring several things. First, Stage 2 measures the configuration file of GRUB (grub.conf). This file is used for specifying bootable O S images that will be presented in the selection menu. Second, Stage 2 is required to measure the O S image that is selected to boot. Third, Stage 2 is also responsible for measuring any other security-critical files (configuration files, library files, etc.). To enable these measurements, grub.conf has been modified according to the present invention in the following two ways; (1) all loading commands such as "kernel" measures the target image automatically, and (2) we added the "measure" command that measures any file specified in its argument. During these steps, the eighth register value of PCR was used for measuring Stage 1.5, Stage 2, and the O S files.

6-4. Measuring OS Kernel and Configurations

In the above implementation, the chain of the measurement process covers OS kernel, security-critical files such as OS configuration files, security policy files, and, a few executables such as Java virtual machine. However, if a large number of files were measured, the number of possible PCR values of trusted configuration would be combinatorial and therefore the server-side database of the trusted PCR values would be unmanageable. Instead, the OS kernel was implemented to be responsible for maintaining the integrity of less security-critical files and resources. Here, the Linux Security Module and the Security-Enhanced Linux (SELinux) to the kernel were applied. If an appropriate SELinux policy file is used, the combination of LSM and SELinux should provide a better protection against unwanted modifications on any parts of the system, such as executables, libraries, and other data files.

Note that the integrity measurement done at the bootstrap time does not guarantee the integrity of the measured code after bootstrap. If the O S does allow some program to modify the already-measured portion of the system, the PCR values stored in the TPM no longer reflect the correct integrity status. Therefore, a strong protection against illegal modification at the OS level is very important.

6-5. Mandatory Access Control Based on LSM SELinux and Java

Figure 14:
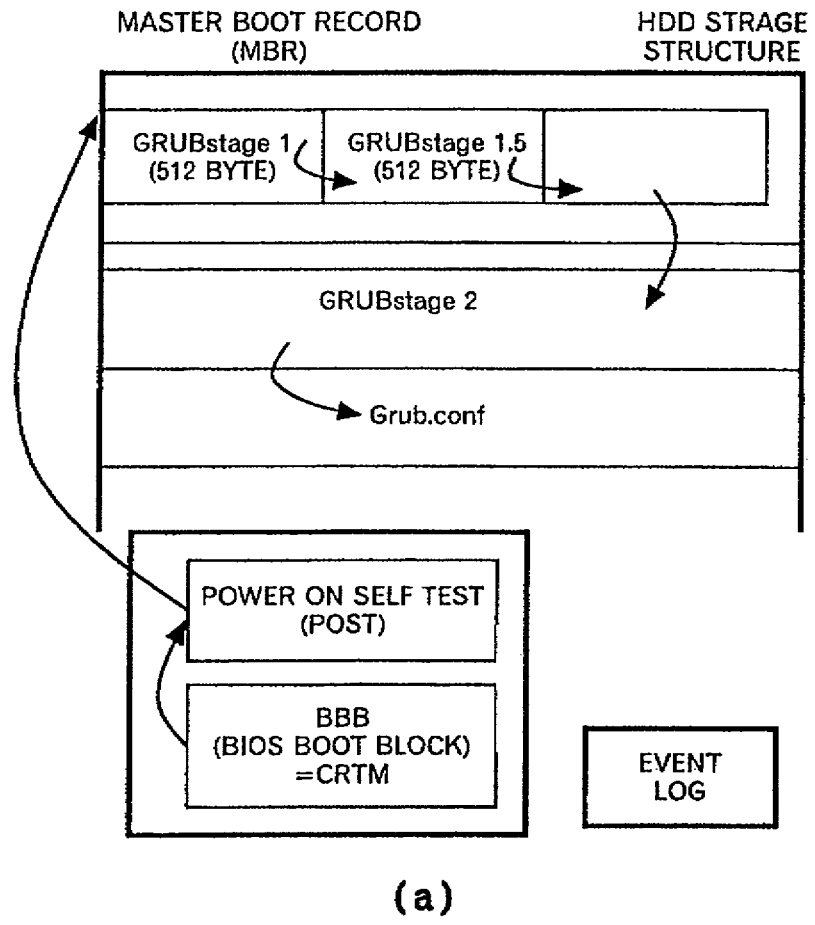
FIG. 14 shows a particular implementation example of the Trust Platform Model structure based on LSM SELinux architecture.

In this embodiment, Trusted Domain Model implementation, we chose a security-enhanced operating system for the Protection Layer, that is, a combination of Linux Security Module (LSM) and SELinux. This combination provides a fundamentally stronger access control than the conventional Unix access control. FIG. 14 shows a particular implementation example of the Trust Platform Model structure based on LSM SELinux architecture.

In FIG. 14, Linux Security Module (LSM) is a Linux kernel patch that enables general purpose access control. LSM places a hook at the access path to every important resource of the kernel and allows a plug-in module (called a policy module) to make access control decisions. This is an important step to securing the Linux operating system because the traditional Unix security model is considered insufficient for providing a reasonable level of security. One of the biggest limitations of standard Unix is that every program run by a user inherits all the permissions granted to the user (this is especially problematic if the user is root) and thus it is very hard to protect the operating system from malicious software.

Security-Enhanced Linux (SELinux) which has developed by NSA, is a policy module for LSM. It enforces the Mandatory Access Control (MAC) policy so that a system-wide security policy can be enforced regardless of the user's careless operations, security vulnerabilities of application programs, or malicious software.

Combining these technologies, we can enforce a system-wide security policy. A domain is realized as a user account, which is well protected from applications running under another user account and even from the root user. A domain instance is a remote shell. When a remote owner logs in to the platform (i.e., creates a domain instance), Pluggable Authentication Module (PAM) interacts with the TCPA chip and unlock the encryption key.

Also if the platform has removable storage, an encrypted file system is necessary. All the private files owned by a service would be encrypted by the service's key stored securely in the TPM so that the files can only be accessible from the owner's domain.

In addition to having an operating system-level separation, the implementation also has application separation at the Java level. This can be done by Java's native access control mechanism (JAAS) or by the permission and user administration mechanisms defined in OSGi.

7. Another Protocols-WS-Security

The implementation uses protocols that are defined on top of the OASIS WS-Security standards.

WS-Security is a set of specifications of security protocol building blocks for Web Services. It provides basic security functionality such as integrity, confidentiality, authentication, and authorization for SOAP messages by defining a generic concept of "claims" represented as "security tokens" to be passed around among the communicating parties and trusted third parties (called Security Token Services).

Figure 15:
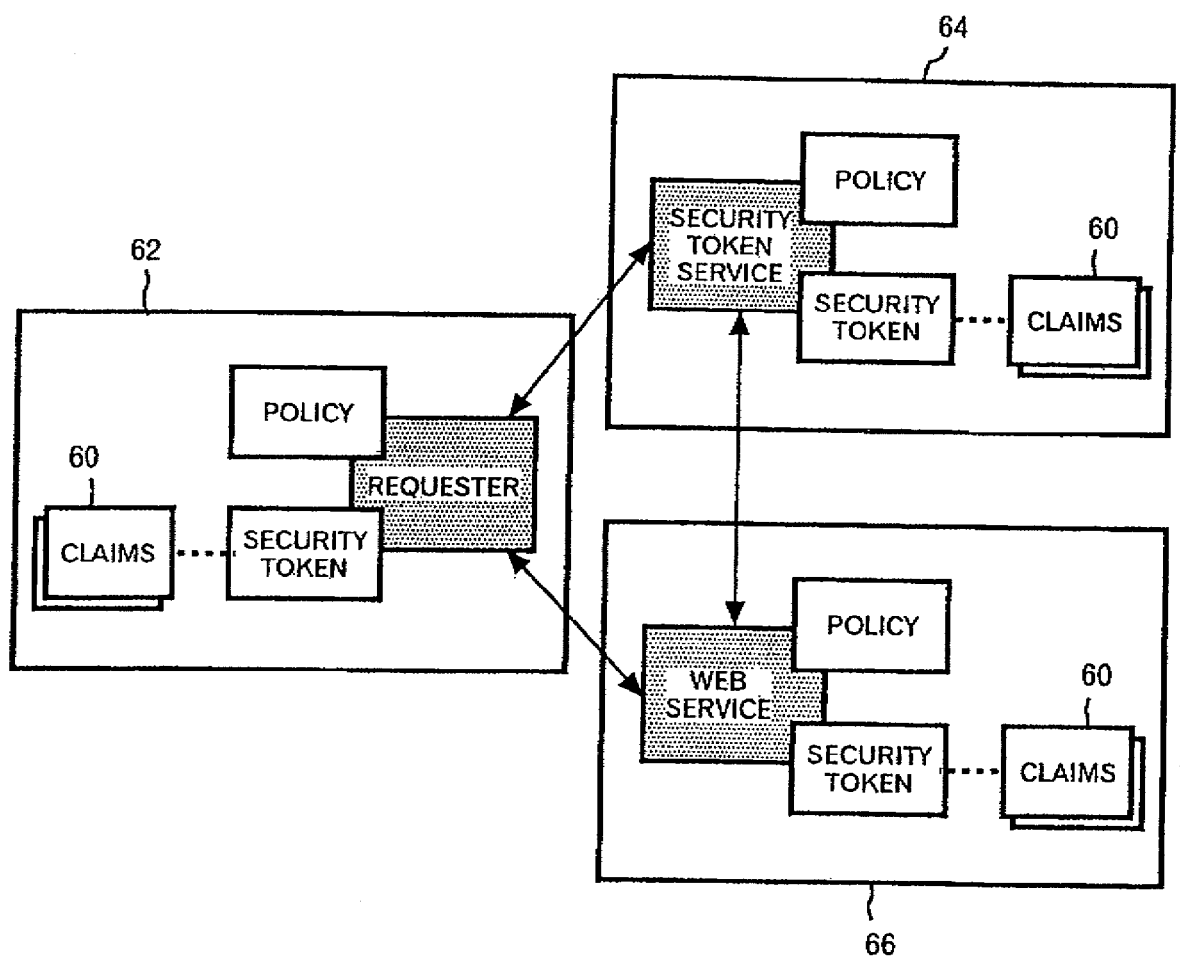
FIG. 15 shows an exemplary embodiment of the present invention configured based on WS-security architecture.

FIG. 15 shows an exemplary embodiment of the present invention configured based on WS-security architecture. Note that a platform integrity measurement is implemented in a claim part 60 are included in each of entities 62, 64, and 66 that can be represented as a security token. The requester 62 such as clients is implemented according to the present invention. The Web service site 64 is also implemented according to the present invention. When the requester 62 requests the Web service to the Web service site 64, the token including signatured credential is sent to the security token service site 66 from, for example, the Web service site 64.

The security token service site 64 issues access permission data to the Web service site 64 and the Web service site 64 determines whether or not the access request from the requester 62 is permitted in Trusted domain service. The platform credentials, such as platform certification and software certification (whether the values contained in this token are trusted), can also be represented as a security token that is issued by a security token service. This provides a sound framework of trust infrastructure of the present invention.

While the foregoing is directed to embodiments of the present invention, other and further embodiments of the invention may be devised without departing from the basic scope thereof, and the scope thereof is determined by the claims that follow.

What is claimed is:

1. A server apparatus connected to a network for providing processed data on demand through said network and for hosting a plurality of resources, said server apparatus comprising:
a trusted platform module that is trusted based on an apparatus root of trust and upon starting or resetting of said server apparatus, for generating a signature value, said signature value comprising:
a first part including a hash of one or more integrity values, representing an integrity of configurations of said server apparatus; and
a second part concatenated to the first part, the second part including an attestation key based on data provided by a trusted third party and used as a signature; and
a communication part for receiving a request through said network from a remote information processing apparatus and for transmitting said signature value and processed data through said network to said remote information processing apparatus;
wherein said server apparatus creates a new domain, the new domain permitting access by the remote information processing apparatus to a subset of said plurality of resources;
and wherein said server apparatus permits accesses to said subset of said plurality of resources by said remote information processing apparatus via said new domain upon receiving a request from said remote information processing apparatus in response to said signature value.

2. The server apparatus of claim 1, wherein certified credentials are transmitted and stored in a storage part of said server apparatus for generating signatures.

3. The server apparatus of claim 1, wherein said plurality of resources is organized as a tree such that said subset of said plurality of resources comprises a sub-tree of said tree, said sub-tree holding a domain secret associated with the new domain and being associated with a domain root key.

4. The server apparatus of claim 3, wherein the trusted platform module protects the domain secret by requiring a proof of possession of an authorization secret associated with the domain root key prior to creating the new domain.

5. The server apparatus of claim 3, wherein a root node of said tree comprises a storage root key that is an only key that is permanently stored in said trusted platform module.

6. The server apparatus of claim 5, wherein said server apparatus creates administration upon starting and/or resetting thereof and submits accesses to said storage root key for enabling accesses to said plurality of resources.

7. The server apparatus of claim 5, wherein said plurality of resources is stored as encrypted forms and said server apparatus permits accesses to said plurality of resources through description with said storage root key.

8. A method for making a server apparatus connected to a network and hosting a plurality of resources provide processed data on demand through said network, said method making said server apparatus execute steps of:
creating an administration domain that is trusted based on integrity values depending on apparatus integrity;
verifying said integrity values to provide a signature value by referring to certified credentials, said signature value and said certified credentials being generated by a trusted platform module in said server apparatus, wherein said signature value comprises:
a first part including a hash of the integrity values; and
a second part concatenated to the first part, the second part including an attestation key based on data provided by a trusted third party and used as a signature;
receiving a first request through said network from a remote information processing apparatus for accessing said server apparatus to obtain services of said server apparatus by transmitting the signature value; and
accepting a second request from said remote information processing apparatus for creating an exclusive domain corresponding to said first request, wherein said exclusive domain is associated with a subset of said plurality of resources.

9. The method of claim 8, wherein said plurality of resources is organized as a tree such that said subset of said plurality of resources comprises a sub-tree of said tree, said sub-tree holding a domain secret associated with said exclusive domain and being associated with a domain root key.

10. The method of claim 9, wherein said trusted platform module protects said domain secret by requiring a proof of possession of an authorization secret associated with said domain root key prior to creating said exclusive domain.

11. The method of claim 9, wherein a root node of said tree comprises a storage root key that is permanently stored in said trusted platform module.

12. The method according to claim 11, wherein said administration domain executes a step of permitting accesses to said storage root key so as to control accesses to said plurality of resources.

13. The method of claim 12, wherein said plurality of resources is stored as encrypted forms and said method further comprises a step of decrypting said plurality of resources using said storage root key to permit accesses by said remote information processing apparatus to said plurality of resources.

14. A non-transitory computer readable storage medium containing an executable program for making an information processing apparatus execute communications through a network that hosts a plurality of resources, where the program performs steps of:
- accepting a signature value, the signature value comprising:
  - a first part including a hash of one or more integrity values depending on hardware configurations; and
  - a second part concatenated to the first part, the second part including an attestation key based on data provided by a trusted third party and used as a signature, wherein at least one of said attestation key and said integrity values is generated by a trusted platform module in a remote server apparatus in said network;
- determining an identity of at least one of said integrity values by extracting said at least one of said integrity values from the signature value; and
- dispatching a request for creating an exclusive domain for said information processing apparatus through said network to said remote server apparatus depending on the determining of said identity of at least one of said integrity values, wherein said exclusive domain is associated with a subset of said plurality of resources.

15. The non-transitory computer readable storage medium of claim 14, wherein the remote server apparatus dispatches said integrity values and processed data through said network to said information processing apparatus.

16. The non-transitory computer readable storage medium of claim 14, wherein said plurality of resources is organized as a tree such that said subset of said plurality of resources comprises a sub-tree of the tree, said sub-tree holding a domain secret associated with said exclusive domain and being associated with a domain root key.

17. The non-transitory computer readable storage medium of claim 16, wherein said trusted platform module protects said domain secret by requiring a proof of possession of an authorization secret associated with said domain root key prior to creating said exclusive domain.

18. A non-transitory computer readable storage medium containing an executable program for making a server apparatus connected to a network and hosting a plurality of resources provide processed data on demand through said network, where the program performs steps of:
- creating an administration domain that is trusted based on integrity values depending on apparatus integrity, an attestation key based on data provided by a trusted third party and used as a signature and said certified credentials being generated by a trusted platform module in said server apparatus;
- verifying said integrity values to provide a signature value by referring to certified credentials;
- receiving a first request over said network from a remote information processing apparatus for accessing said server apparatus to obtain services of said server apparatus by transmitting said signature value, said signature value comprising:
  - a first part including a hash of said integrity values; and
  - a second part concatenated to the first part, the second part including an the attestation key; and
- accepting a second request from the remote information processing apparatus for creating an exclusive domain corresponding to said first request, wherein said exclusive domain is associated with a subset of said plurality of resources.

19. The non-transitory computer readable storage medium of claim 18, wherein said plurality of resources is organized as a tree such that said subset of said plurality of resources comprises a sub-tree of said tree, said sub-tree holding a domain secret associated with said exclusive domain and being associated with a domain root key.

20. The non-transitory computer readable storage medium of claim 19, wherein said trusted platform module protects said domain secret by requiring a proof of possession of an authorization secret associated with said domain root key prior to creating said exclusive domain.

* * * * *